Figure 1:
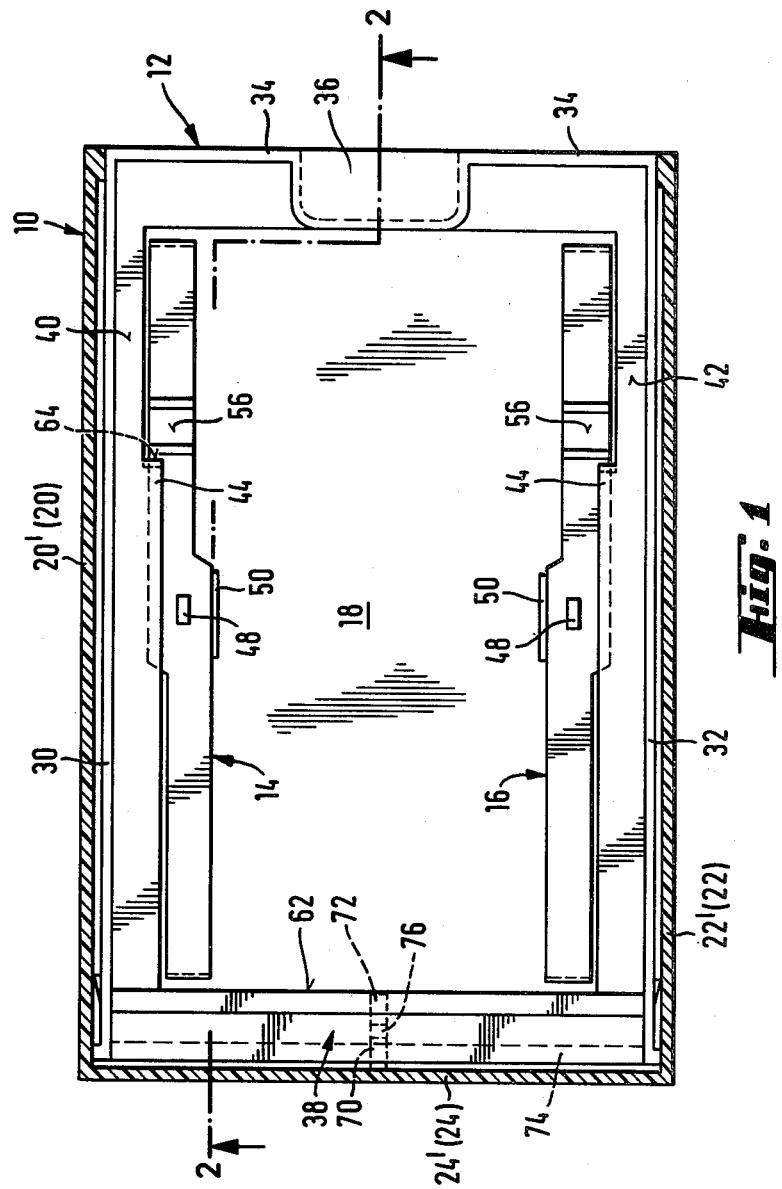

United States Patent [19]
Ackeret

[11] Patent Number: 4,473,154
[45] Date of Patent: * Sep. 25, 1984

[54] CONTAINER FOR PHOTOGRAPHIC PRINTS

[75] Inventor: Peter Ackeret, Kusnacht, Switzerland

[73] Assignee: Licinvest AG, Chur, Switzerland

[*] Notice: The portion of the term of this patent subsequent to Nov. 15, 2000 has been disclaimed.

[21] Appl. No.: 456,391

[22] Filed: Jan. 7, 1983

[30] Foreign Application Priority Data

Jan. 29, 1982 [DE] Fed. Rep. of Germany ....... 3202928

[51] Int. Cl.³ ............................................. B65D 25/00
[52] U.S. Cl. ................................ 206/455; 206/45.34; 206/556; 206/817
[58] Field of Search ..................... 206/45.34, 387, 425, 206/449, 454, 455, 494, 554, 555, 556, 39, 39.4, 817

[56] References Cited

U.S. PATENT DOCUMENTS

| 390,984 | 10/1888 | Owen | 206/39 |
|---|---|---|---|
| 441,607 | 11/1890 | Woodward | 200/425 |
| 735,773 | 8/1903 | Johnson | 221/260 |
| 934,225 | 9/1909 | Sayles | 206/817 |
| 1,155,795 | 10/1915 | Cabell | 206/817 |
| 3,070,260 | 12/1962 | Smith | 206/817 |
| 3,922,700 | 11/1975 | Asano et al. | 206/455 |
| 4,295,565 | 10/1981 | Takevchi | 206/455 |
| 4,415,079 | 11/1983 | Ackeret | 206/45.34 |

FOREIGN PATENT DOCUMENTS

| 293217 | 7/1916 | Fed. Rep. of Germany | 206/455 |
|---|---|---|---|
| 852434 | 10/1952 | Fed. Rep. of Germany | 206/45.34 |

*Primary Examiner*—William T. Dixson, Jr.
*Assistant Examiner*—Brenda J. Ehrhardt
*Attorney, Agent, or Firm*—Lalos, Leeds, Keegan, Lett, Marsh, Bentzen & Kaye

[57] ABSTRACT

The container for photographs of the same size comprises a housing from which a slide can be pulled out. In the housing there is a spring arrangement which presses the photographs against a viewing window of the housing. The spring arrangement comprises leaf springs which, when the slide is pulled out, are pressed away from the viewing window by control edges moulded to the slide, directly at the start of pulling out of the viewing window, and remain pressed away during further pulling out of the slide.

15 Claims, 4 Drawing Figures

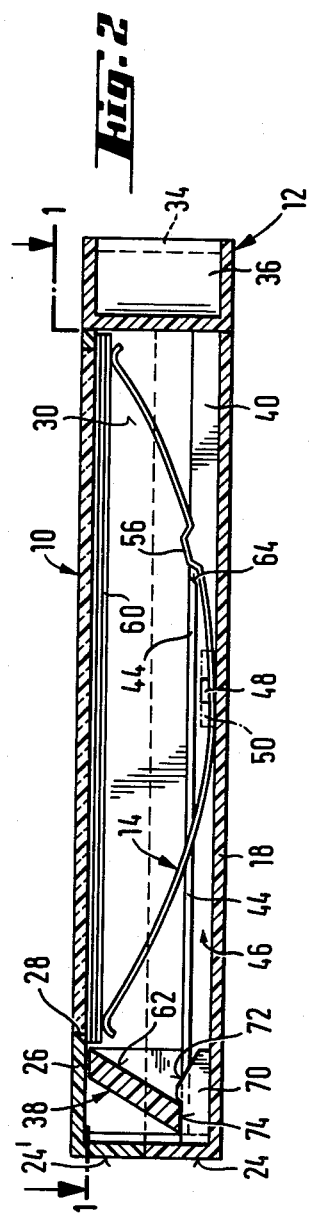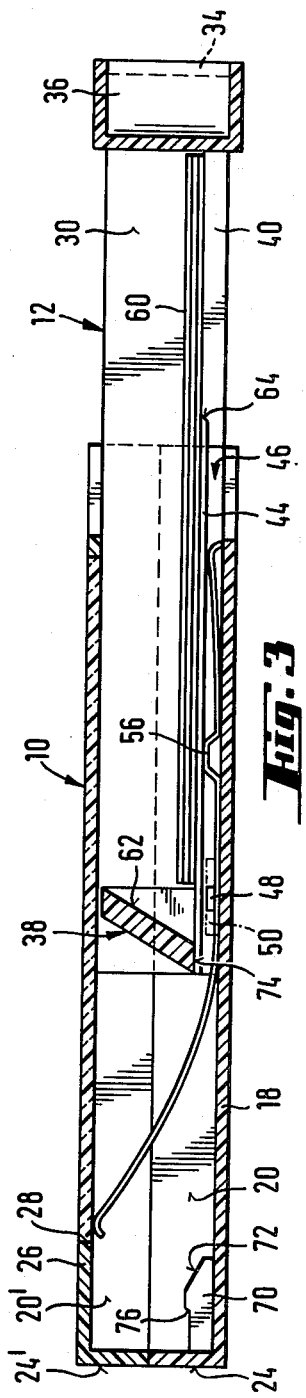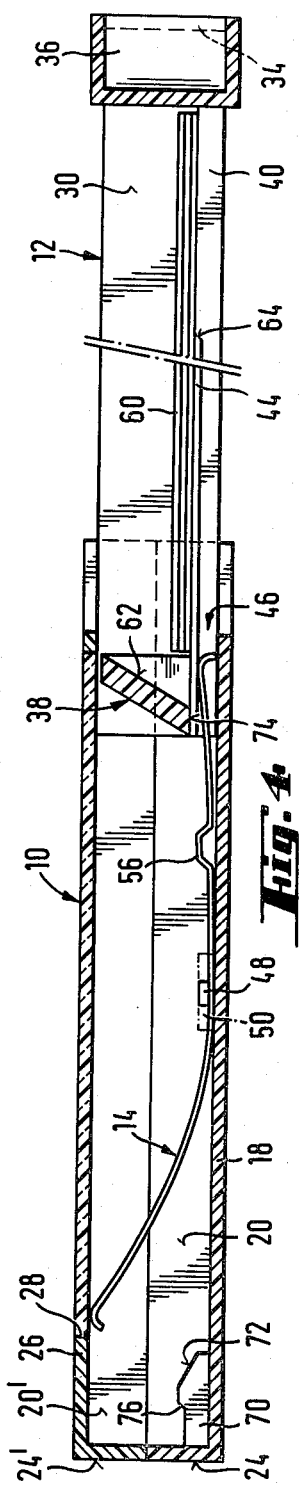

CONTAINER FOR PHOTOGRAPHIC PRINTS

The invention relates to a container for photographic prints having the features mentioned in the precharacterising clause of patent claim 1. Containers having these features are known from German Offenlegungsschrift 2,742,347. They serve, in the manner of a picture frame, for presenting the topmost print of a stack of photographic prints flat against the viewing window, specifically irrespective of how many prints are in the stack. However, the pressing action of the spring arrangement will be cancelled during the time when the picture stack is extracted or inserted.

However, the known containers are still in need of improvement. On the one hand, handling must be without problems for the user, and especially no damage to the photographic prints must occur even in the event of careless handling. This risk is present especially when the stack comprises only a few prints and the prints are not level. On the other hand, it should be possible to produce the containers as definite articles of mass consumption with a minimum of outlay, specifically both as regards the consumption of material and as regards assembly.

The object of the invention is to develop further the container of the type in question, in such a way that the above requirements are satisfied.

The achievement of this object, provided according to the invention, is defined in patent claim 1; the subclaims mention preferred embodiments of the idea of the invention.

The attached drawings illustrate largely diagrammatically an exemplary embodiment of the container according to the invention.

FIG. 1 shows the horizontal projection of the container approximately along the sectional line 1—1 in FIG. 2, without the print stack inserted, FIG. 2 is a sectional representation approximately along the line 2—2 in FIG. 1, but with the photographic prints inserted, FIG. 3 shows the container similar to FIG. 2, but half-opened, and FIG. 4 is likewise similar to FIG. 2 or 3, the container being opened completely here.

The container consists of four components: the housing 10, which itself is composed of a lower shell and an upper shell which can be welded ultrasonically to one another in the case of plastic injection mouldings, also the slide 12 injection-moulded in one piece from plastic, and the two springs 14 and 16 which together form the spring arrangement.

The lower shell of the housing incorporates the housing bottom 18 and the longitudinal walls 20, 22 extending approximately to half the housing thickness, and the transverse wall 24. The upper shell incorporates longitudinal walls 20', 22' congruent with those of the lower shell, and a transverse wall 24' moulded onto a window-frame surface 26 located opposite the housing bottom and having a window cut-out 28. This can be open, closed by means of a foil glued in on the inside and consisting of transparent material, or also, as shown, glazed by means of an inserted disk made of transparent plastic.

The slide is, in principle, an open frame with longitudinal spars 30 and 32, an outer transverse spar 34 with a gripping piece 36, and an inner transverse spar 38. The longitudinal spars and the outer transverse spar are of angular cross-section, the inwardly angled legs being parallel to the viewing window. The stack of photographic prints (called "pictures" for short below) rests on these legs 40, 42 of the longitudinal spars. In a plan view, the two legs 40, 42 have a stepped portion which is obtained by narrow runners 44 moulded to the legs; between each of these runners and the housing bottom there remains a free space 46.

Two slip-on pins project from the housing bottom towards the viewing window, and ribs 50 are also moulded onto the housing bottom parallel to one another and to the direction of movement of the slide, which emerges directly from FIGS. 2-4.

A leaf spring 14 or 16 respectively is slipped on to each of the pins 48 by means of an orifice or a hole which is made complementary here to the contour of the pins 48 as a rectangular perforation. The ribs 50 serve, in addition, to prevent any tilting of the leaf springs: the springs rest respectively against them by means of an edge.

The two leaf springs have a very flat Z-shaped contour which is designed so that the two springs can be cut identically (if they are also pre-stressed and fitted as a mirror image) and so that they can be cut to length from a strip without waste, or at least with a minimum of waste.

The pre-stressing or pre-curvature of the springs can be seen in FIG. 2. The two free spring ends extend upwards from the fastening point 48 and are rounded gently just before their end edge where they rest against the rear side of the lowest picture 60. The end of the two springs which faces the housing orifice and consequently the outer transverse spar 34 of the slide is provided with embossing, so that a thickened portion 56 is obtained. When the slide is pushed completely into the housing, its runners 44 cover the fastening region and some of the spring end projecting towards the housing orifice, in the outer edge portion of the springs; the runners end just before the thickened portions 56. On the other hand, the spring ends facing away from the housing orifice are not covered by the runners 44. Consequently, see FIG. 2, in this position of the slide, both spring ends can rest from below, according to their pre-curvature, against the pictures and press them against the viewing window.

When the gripping piece of the slide is pulled, the inner transverse spar 38 runs by means of its sloping control surface 62 onto the rounded inner spring end and presses the latter downwards away from the viewing window of the housing. Approximately at the same time, sloping control surfaces 64 on the ends of the runners 44 also run onto the thickened portions 56 of the other free spring ends and likewise press these away from the viewing window. The picture stack consequently becomes loose almost immediately after the start of the slide stroke and is carried along by the slide directly. During the further slide stroke, the inner spring ends are gradually released again by the transverse spar 38, whilst the outer spring ends acting as a brake remain pressed down. The latter fact is of special importance. If this spring end also were gradually released, for example during the time when the slide is pushed in again, a picture could, especially when it is curved upwards, be clamped firmly against the housing on one side by the spring, as indicated by broken lines in FIG. 3, whilst the slide still seeks to push the picture into the housing by means of its gripping piece. This danger would be slight in the case of a thick picture stack, but is considerable when only a few or only a single picture is pushed in.

Also moulded on the housing, in the region of the lower edge located opposite its orifice, is a locking element 70, over the sloping guide surface 72 of which slides the lower edge 74 of the inner transverse spar 38 of the slide, elastic deformation taking place, before it snaps downwards again behind a step 76 as soon as the slide is pushed in completely.

I claim:

1. Container for the storage of photographic prints of the same size, with a housing having a substantially rectangular horizontal projection and provided with a viewing window, with an essentially frame-shaped slide displaceable parallel to the plane of the viewing window through an orifice provided in a narrow side of the housing, and with a spring arrangement which is fastened in the housing and by means of which photographic prints lying in the slide can be pressed against the viewing window of the housing, but are released when the slide is pulled out of the housing, wherein the spring arrangement comprises leaf springs which are supported approximately centrally on the housing bottom and are pre-stressed by means of the free ends towards the viewing window and which extend parallel to the direction of movement of the slide, and wherein the slide has control edges which, after the start of pulling out of the slide, running essentially simultaneously onto the two spring ends press these away from the viewing window and keep the spring end on the same side as the housing orifice pressed away over the entire remaining slide stroke.

2. Container according to claim 1, wherein the spring arrangement comprises two leaf springs.

3. Container according to claim 2, wherein the control edge for the spring ends facing away from the housing orifice is formed on a transverse spar of the slide which extends parallel to the housing orifice.

4. Container according to claim 3, wherein the slide has longitudinal spars which extend parallel to its stroke and to which control runners provided with the control edges for the spring ends facing the housing orifice are moulded.

5. Container according to claim 4, wherein the leaf springs have, near their fastening point and on the side facing the housing orifice, a thickened portion which interacts with the control runners.

6. Container according to claim 5, wherein the thickened portion is designed as an embossing of the leaf-spring material.

7. Container according to claim 3, wherein the transverse spar is designed as one element of a locking arrangement for retaining the slide in the housing, whilst the other element is moulded to the housing.

8. Container according to one of the preceding claims, wherein the slide is a plastic article injection-moulded in one piece.

9. Container according to one of claims 1 through 7, wherein the housing comprises plastic injection mouldings.

10. Container according to claim 2, wherein both leaf springs are cut identically.

11. Container according to one of claims 1 through 7 and 10, wherein the housing bottom has pins onto which the leaf springs are slipped by means of a complementary orifice.

12. Container according to claim 11, wherein the housing bottom has ribs on which the leaf springs are supported laterally.

13. Container according to one of claims 1 through 7 and 10, wherein the edges of the leaf springs near to the housing window are bent away from the latter and towards the housing bottom.

14. Container according to claim 1, wherein a single leaf spring located approximately centrally in the housing is provided.

15. Container according to claim 2, wherein the two springs are sub-divided in the direction in which the slide is pulled out.

* * * * *